United States Patent [19]

Beinhauer

[11] 4,358,417
[45] Nov. 9, 1982

[54] METHOD FOR REPAIRING A PIPE COUPLING

[75] Inventor: Ernest L. Beinhauer, Harrisburg, Pa.
[73] Assignee: AMP Incorporated, Harrisburg, Pa.
[21] Appl. No.: 266,398
[22] Filed: May 22, 1981
[51] Int. Cl.³ .............................................. B29D 27/00
[52] U.S. Cl. ..................................... 264/36; 264/46.9; 425/12; 425/13
[58] Field of Search ................. 264/46.9, 46.6; 425/12, 425/13

[56] References Cited

U.S. PATENT DOCUMENTS

| | | | |
|---|---|---|---|
| 3,141,478 | 7/1964 | Copeland | 138/97 |
| 3,350,050 | 10/1967 | Buczala et al. | 249/87 |
| 3,356,778 | 12/1967 | Anderson | 264/46.9 X |
| 3,955,043 | 5/1976 | Palmer et al. | 174/84 |
| 4,049,480 | 9/1977 | Kutscake | 264/46.9 X |
| 4,053,176 | 10/1977 | Hilbush | 285/15 |

*Primary Examiner*—Philip E. Anderson
*Attorney, Agent, or Firm*—F. Brice Faller

[57] ABSTRACT

Method of repairing a leaking bell and spigot joint employing a containment which is fit around the coupling to form a completely enclosed annular cavity. A premixed fluid composition comprising an acrylic, a resin, a filler, and a blowing agent is injected into the cavity. This hardens exothermically, providing heat to activate the blowing agent and expand the composition as it sets, forcing the composition into any irregularities to seal the leak and leave a pressurized acrylic sealing ring on the pipe.

5 Claims, 8 Drawing Figures

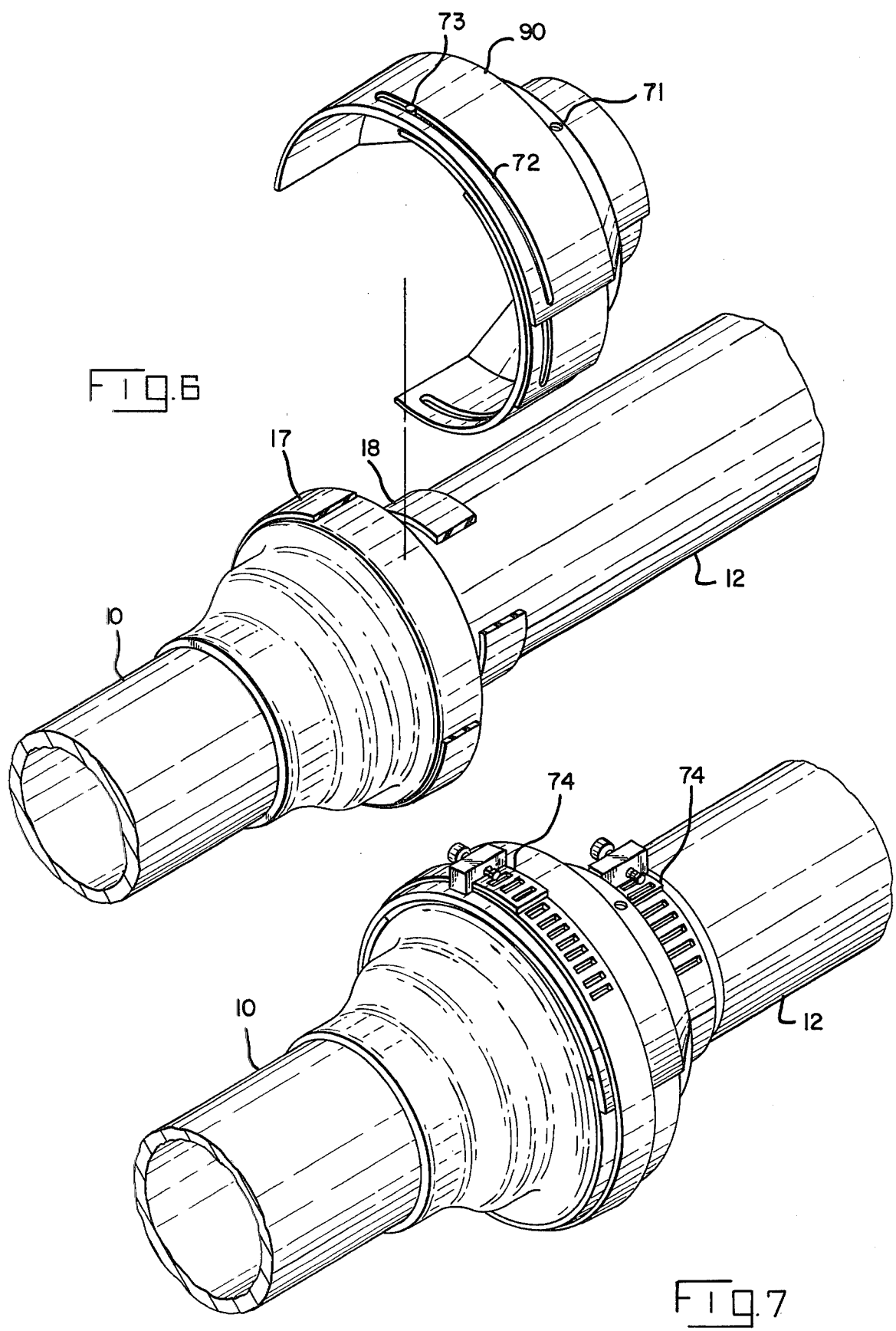

METHOD FOR REPAIRING A PIPE COUPLING

BACKGROUND OF THE INVENTION

The present invention relates to a method for repairing a leaking pipe joint, particularly a bell and spigot joint.

Cast iron pipe is used extensively for water, gas, sewage, culverts, drains, etc., in a wide range of sizes and for varying pressures, and is particularly adapted to underground and submerged service because of its comparatively high resistance to corrosion. The pipe comes with either flanged ends or bell-and-spigot ends, the latter generally being used for underground work, making a tight joint when properly put together, caulked, and leaded. Flanged pipe has superior strength and tightness of joint and is used where the pipe can be well supported, the joints being made up with gaskets. The bell-and-spigot joint is more flexible, provides for expansion and contraction, and is therefore especially suitable for underground water and gas pipe.

Bell-and-spigot joints are generally caulked with oakum and sealed by pouring and caulking lead into the bell. Through the years, the oakum and lead by reason of internal pressure, vibration, temperature fluctuation, settling, road traffic and other causes may allow a leak. It then becomes necessary to expose and repair the joint. Traditionally this was done by repacking with new oakum and new lead, or applying a cement patch. Another method is to place a permanent mechanical compression member about a flexible seal on the joint. Other methods have been tried, such as placing a containment with an annular cavity around the joint and pouring molten metal into the containment to form a sealing collar. This could be accomplished by igniting thermite in a funnel mounted on the containment. This method, in addition to employing an almost violent reaction, did not always produce a good seal, since the metal could not be forced into the leaking joint and contracted on cooling. More recently, epoxy has been applied to joints by working it around the joint with a spatula, but this is somewhat troublesome and still does not provide positive pressure for working the epoxy into the joint.

SUMMARY OF THE INVENTION

The present invention teaches the use of a containment about the joint and injecting a fluid plastic composition therein which subsequently expands while hardening to form a high strength, impermeable sealing collar on the joint. The composition comprises an acrylic which is premixed with a hardening catalyst and a blowing agent.

It is an object of the invention to force the composition into the joint and leave a pressurized collar in a simple process which does not require expenditure of considerable time or use of numerous tools by a worker in the close confines of an excavation. The method does not require use of an open flame or extreme heat which can be quite dangerous in an excavation, and particularly where working on a gas main. The method provides a better seal than prior art methods and uses inexpensive materials. As it is quicker, this not only means less toil for the worker but lower labor costs for his employer. The composition may be varied to achieve varying degrees of expansion, flexibility, and hardening time. Further, the composition will set under water and in low temperatures.

Other objects and advantages of the invention will be apparent upon examination of the drawings and description which follow.

BRIEF DESCRIPTION OF THE DRAWINGS

While the novel features of the invention are set forth with particularly in the appended claims, the invention will be better understood and appreciated by reference to the following brief and detailed descriptions of the drawings.

FIGS. 6 and 7 are perspective views depicting the use of alternative plastic shell tools for practicing the method of the present invention.

DETAILED DESCRIPTION OF THE PREFERRED EMBODIMENT

Figure 1:
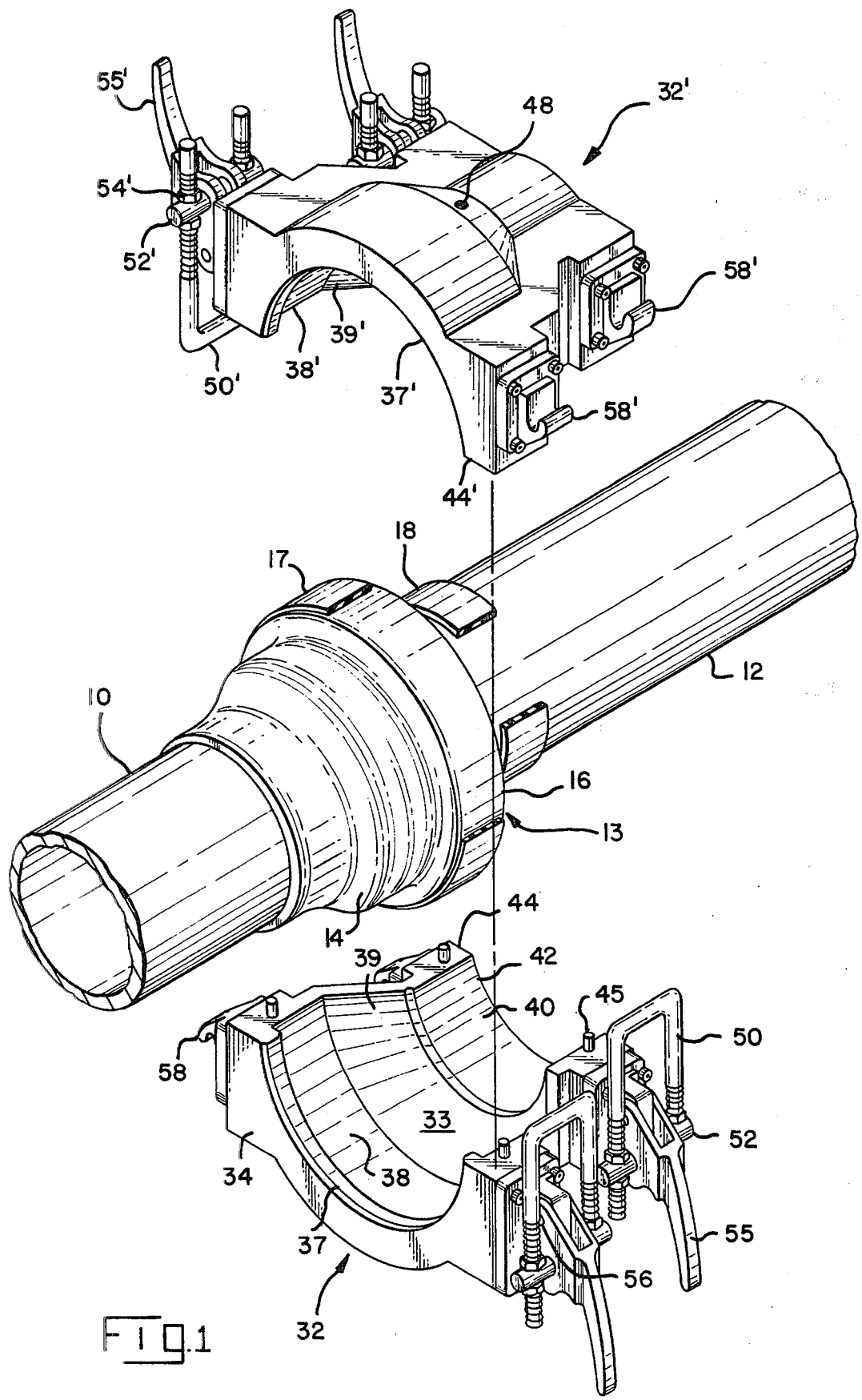
FIG. 1 is a perspective view of two pipe lengths joined by a standard bell-and-spigot joint.

FIG. 1 shows two lengths of pipe 10,12 joined at a standard bell-and-spigot joint 13. Each length of pipe has a bell 14 at one end and a spigot 24 (FIG. 3) at the other end. The method as disclosed herein will utilize tools adapted to such a standard joint in a straight length of pipe.

A containment 30 comprises two containment halves 32,32' which are substantially identical, so that only one half will be described, with the like component in the other half given the same reference numeral with a prime notation. Each half 32,32' has a contiguous series of semi-circular inner surfaces defining a semi-circular cavity 33 so that the two halves 32,32' will form a cavity having radial symmetry when fit together. Half 32 has a first end 34 and a second end 42 with a semi-circular flange 37 at first end 34, which is contiguous with semi-circular bearing surface 38, which is contiguous with semi-circular moulding surface 39, which is contiguous with bearing surface 40 at second end 42. Half 32 has clamps so fixed on one side thereof and latches 58 opposite the clamps. Each clamp 50 is adjustably mounted in a cylindrical cross bar 52 by means of nuts 54 threaded onto the clamp. The cross bar 52 is journaled in pivot handle 55 which is mounted to half 32 at pin 56 so that the clamps 50 are moveable. Clamps 50 are positioned to mate with latches 58', which clamps 50' are positioned to mate with latches 58 when the mating surfaces 44,44' of the respective containment halves 32,32' are placed together. Plug 45 in half 32 is profiled to fit into holes 46 (not visible) in half 32' to align the two halves 32,32'. Gasket 17 is positioned on circumferential surface 16 while gasket 18 is positioned as shown on pipe length 12 prior to moving the halves 32,32' together.

Figure 2:
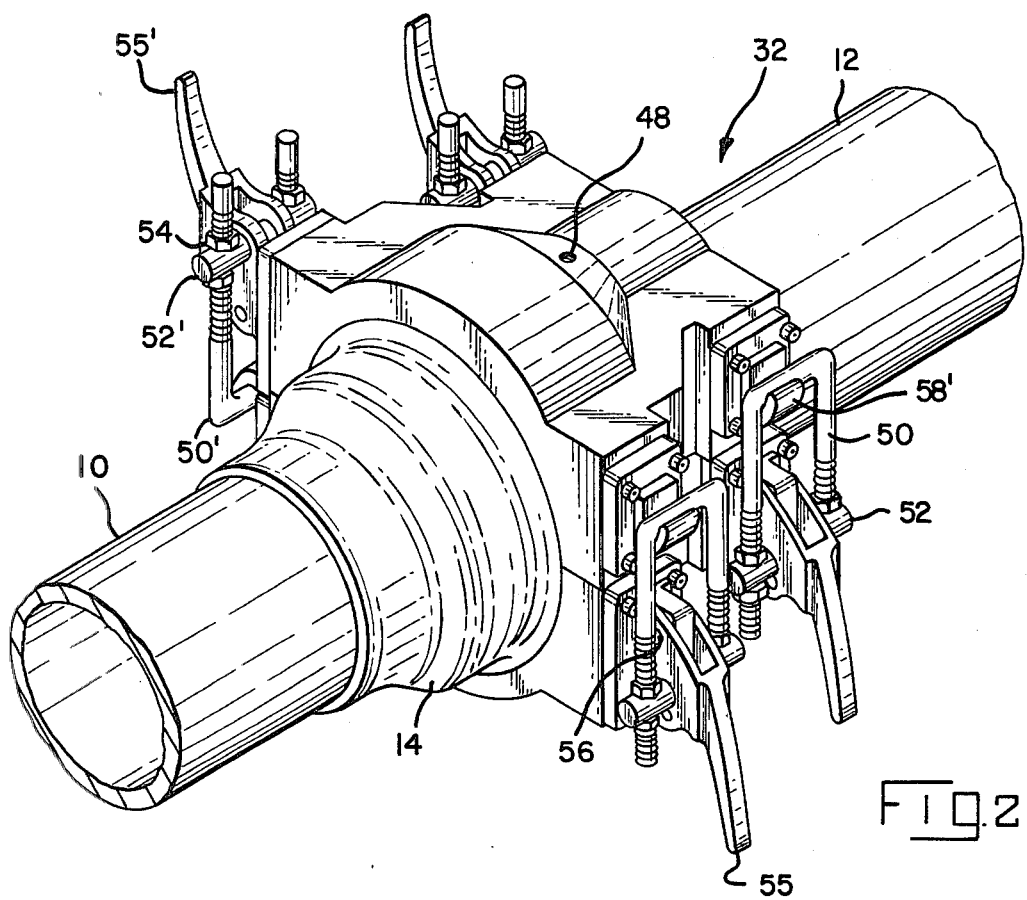
FIG. 2 is a perspective view of the containment joint with clamps.

FIG. 2 is a perspective of the containment 30 assembled over the joint with the clamps 50 locked onto latches 58'. Locking is accomplished in toggle fashion, when the center line of the clamp bar 52 is inside of the line formed by the pivot pin 56 and the contact between the clamp 50 and latch 58'.

Figure 3:
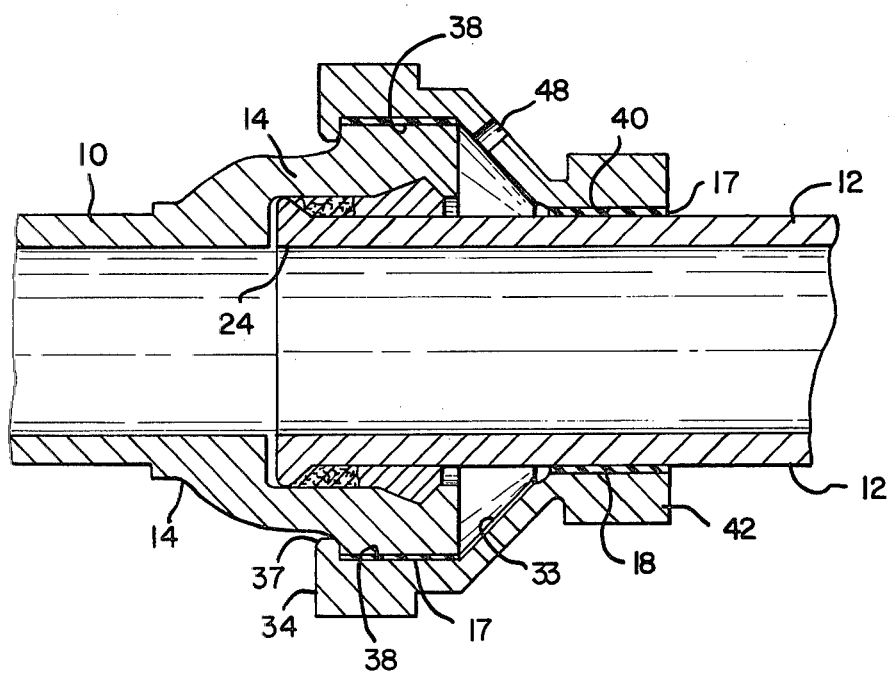
FIG. 3 is a cross-section of the containment halves secured to the bell-and-spigot joint.

FIG. 3 shows the containment 30 are secured to the bell-and-spigot joint 13 in cross section. Here the construction of a standard joint is evident; the spigot 24 on pipe 12 is fit into bell 14 on pipe 13 so it abuts the inside surface of the bell. The joint is packed with oakum 21 and sealed with lead 22 which flows into annular groove 20 in the bell 14 when the lengths 12 and 13 were originally assembled. The containment halves 32,32' are fit onto the joint 13 so that bearing surface 38 presses gasket 17 against bell 14, while bearing surface 40 presses gasket 18 against the surface of pipe 12. The thickness of the gaskets 17,18 may be varied to accommodate substantial variations in pipe diameter, while small variations are accommodated by the compressibility of the gaskets. The containment 30 thus completely encloses annular cavity 26 next to joint 13 except for injection port 48 in containment half 32'.

Figure 4:
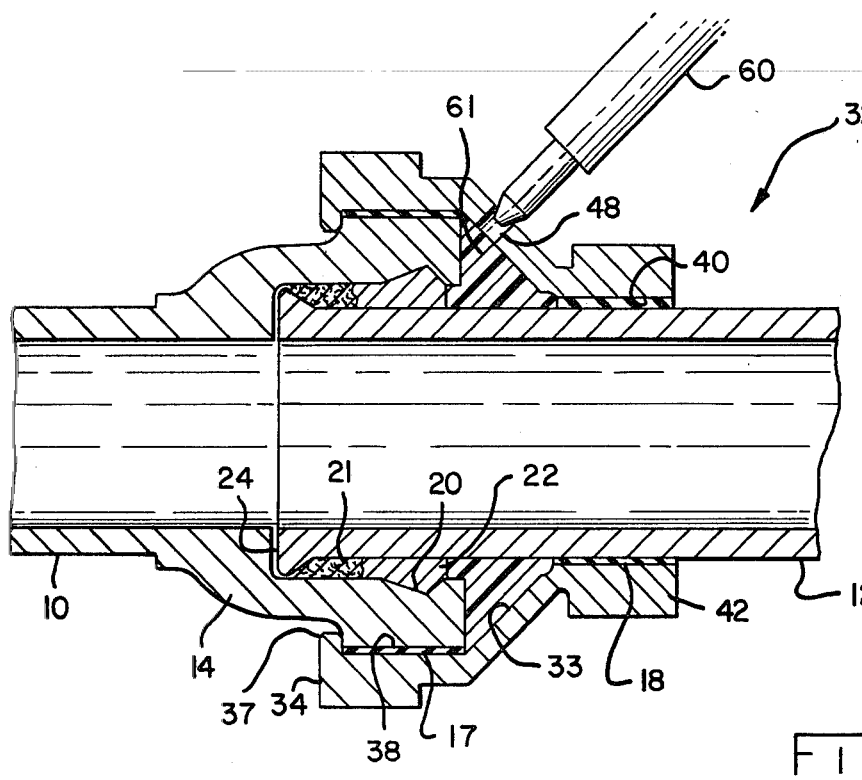
FIG. 4 is a cross-section of the containment halves secured to the bell-and-spigot joint with injection of the resin sealing material into the cavity defined by the containment halves and the joint.

FIG. 4 shows the containment 30 secured about the joint 13, a fluid composition 61 is injected into the cavity 26 through port 48 by means of injector 60. The composition preferably comprises an acrylic, a catalyst to harden the acrylic, a filler such as glass fibers, a plasticizer, and a blowing agent. A standard acrylic such as Versilok 506, a trademark of the Hughson Chemical Division, is used. It is mixed with a catalyst such as benzoyl peroxide immediately prior to injection. The catalyst initiates polymerization in an exothermic reaction which results in the formation of a hard annular collar in the shape of annular cavity 26. The heat released during polymerization activates the blowing agent which is also premixed in the composition. The blowing agent causes the composition to expand into the joint to seal any leaks and also to fill any surface irregularities in the pipe 12 and bell 14. The injection port 48 is valved so that it may be closed after injection or plugged to prevent the composition from being extruded from the containment 30 as it expands. After the composition 61 has hardened to form a collar against the joint, the clamps 50 are released from latches 58' and the halves of 32,32' of the containment 30 are removed. In this regard, it is advisable to coat the interior of halves 32,32' with grease or a dry lubricant prior to assembly to prevent the acrylic from adhering thereto. Likewise, it is advisable to clean the pipe surfaces in the area of the bell-and-spigot joint 13 in order to insure good adhesion of the acrylic. The plasticizer lends some elasticity to the hardened collar so that the repaired joint will not succumb to vibration and allow another leak.

Figure 5:
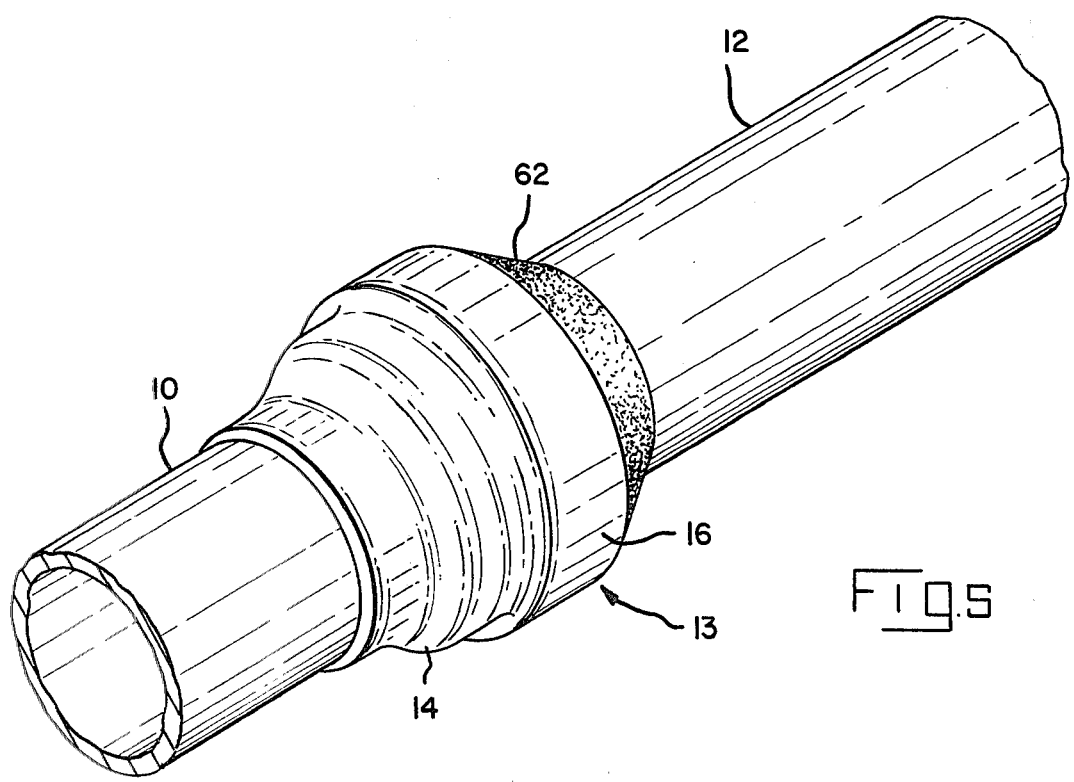
FIG. 5 is a perspective of the bell-and-spigot joint after its repair.

FIG. 5 depicts a bell-and-spigot joint after repair by the method of the present invention. The acrylic collar 27 is firmly in place about the pipe. The pressure of expansion within the confines of the cavity in the assembled containment leave a residual pressure in the collar 27 which causes it to fit like an inflated rubber tire on a rim. This effect combined with the adhesive property of the acrylic resin and the strength imparted by the binder make for a superior seal for a leaking joint.

Figure 8:
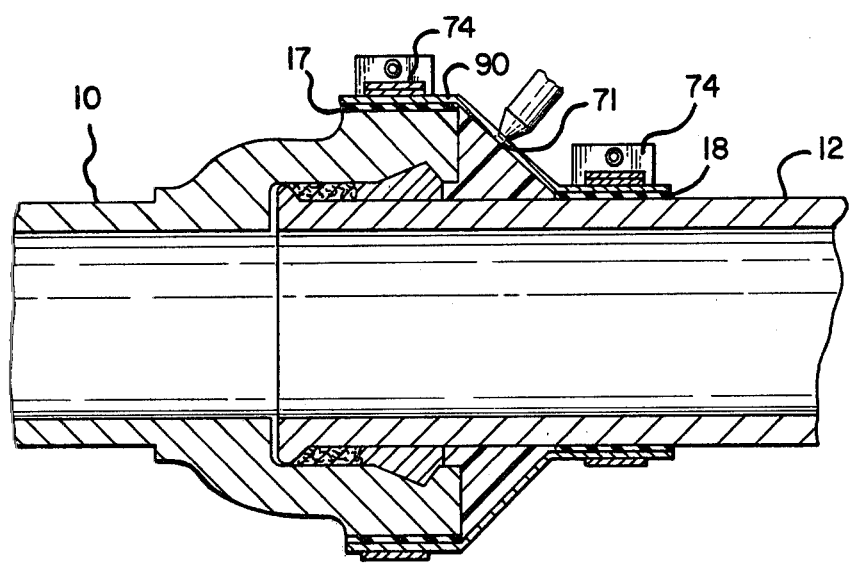
FIG. 8 is a cross-section of the alternative plastic containment shells secured to the bell-and-spigot joint with injection of the resin sealing material into the cavity defined by the containment shells and the joint.

FIGS. 6 and 7 depict an alternative tool for practicing the method of the present invention, a set of three substantially identical thin-walled plastic shells 70. Each shell extends over 120° of circular arc so that the shells 70 will overlap to form a complete containment as shown in FIG. 7. Proper alignment and slideable engagement is facilitated by a slot 72 and pin 73 on each shell. The pin 73 on each shell 70 is positioned to engage the slot 72 on the adjacent shell as shown. The shells are secured about the joint with band clamps 74 as shown and sealing is accomplished by gaskets 17,18 as before. As shown in FIGS. 6 and 8 an aperture 71 is provided in one of the shells 70 so that injection of the acrylic composition may be carried out as with containment 30.

An advantage of the alternative is that the shells 70 may be cheaply manufactured of polystyrene or other suitable material which provides some flexibility without elasticity, which would of course allow the blowing agent to expand the composition without forcing it as effectively into the leaking joint. The shells more readily accommodate variations in pipe size than the fixed containment 30 by simply tightening the band clamps 74. The shells are considerably less bulky than the containment 30, an advantage readily appreciated by a worker having to entire the confines of a trench excavated for the sole purpose of exposing a joint in an underground pipe. Further, the repair may be expedited as the shells, being inexpensive to manufacture, are "disposable" and may be left on the joint indefinitely after injecting the composition. Thus the trench may be backfilled as soon as the composition is injected.

The foregoing describes the method of the present invention as applied to the repair of a bell-and-spigot joint; but the principles apply as readily to flanged pipe. For other types of joint, a modification in the containment bearing surfaces would be required so that a complete annular cavity is formed about the leaking joint in any event.

The embodiments of the invention described above are exemplary and not intended to limit the scope of the claims which follow.

What is claimed is:

1. A method for repairing a leaking portion of a pipe member which comprises the following steps:
   providing containment means around said leaking portion of said pipe member, said containment means having a first end and a second end, each said end having an aperture profiled to fit closely around the circumference of said pipe member, said containment means defining a cavity between said ends and around said pipe member, said containment means comprising at least two pieces assembled around said pipe member,
   securing said containment means to said pipe member so that said leaking portion communicates with said cavity,
   injecting a chemical composition in fluid form into said cavity, said composition filling said cavity, said composition subsequently hardening to form an impermeable solid, said composition expanding after injection, whereby,
said composition will expand in said cavity to fill any irregularities therein and thereby seal said leaking portion.

2. The method of claim 1 wherein said composition comprises an acrylic with a catalyst mixed therein just prior to injection, said catalyst causing said composition to harden in an exothermic reaction, said composition further comprising a blowing agent which causes expansion of the composition when heated, said exothermic reaction providing sufficient heat to cause said expansion.

3. The method of claim 1 wherein said containment means is in two pieces mateable against each other, each piece having a first end and an opposed second end, each end having a semi-circular notch profiled to match the outside diameter of the pipe member to be repaired, said mateable pieces completely enclosing said cavity when fit together on a pipe member, said pieces having securing means thereon to secure said pieces together while expansion of the composition occurs, said pieces being removable after said composition has hardened and expanded to form an annular ring which seals said leaking portion.

4. The method of claim 1 wherein said cavity is profiled to accommodate a pipe coupling, said method being directed to the repair of a leak in a pipe coupling, said composition expanding into said coupling to seal said leak.

5. The method of claim 1 wherein said method is directed to the repair of a leaking pipe coupling on a straight length of pipe, said containment means comprising three or more substantially identical thin-walled pieces which overlap, said containment means being radially symmetric about the axis of said pipe, whereby said pieces may be secured to said pipe by a band clamp at each end, one end on each side of said leaking coupling, said band clamps forcing said apertures into close fits around the circumference of said pipe, the degree of overlap compensating for small variations in outside diameter of the pipe.

* * * * *